(12) United States Patent
Jang et al.

(10) Patent No.: US 11,847,974 B2
(45) Date of Patent: Dec. 19, 2023

(54) DISPLAY DEVICE AND VIRTUAL REALITY DEVICE

(71) Applicant: LG DISPLAY CO., LTD., Seoul (KR)

(72) Inventors: Kyungjin Jang, Gyeonggi-do (KR); HyeonSik Kim, Incheon (KR); UnSang Yu, Gyeonggi-do (KR); Kwangdug Choi, Gyeonggi-do (KR); JinBong Chung, Gyeonggi-do (KR); Sunkyung Shin, Gyeonggi-do (KR); Sojung Jung, Gyeonggi-do (KR); Beom-Jin Kim, Seoul (KR); Bongchoon Kwak, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/963,444

(22) Filed: Oct. 11, 2022

(65) Prior Publication Data
US 2023/0178029 A1 Jun. 8, 2023

(30) Foreign Application Priority Data
Dec. 6, 2021 (KR) ........................ 10-2021-0172777

(51) Int. Cl.
*G09G 3/30* (2006.01)
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0842* (2013.01); *G09G 2310/0297* (2013.01); *G09G 2340/0435* (2013.01); *G09G 2354/00* (2013.01)

(58) Field of Classification Search
CPC ............... G09G 3/3266; G09G 3/3233; G09G 2300/0842; G09G 2310/0297; G09G 2340/0435
See application file for complete search history.

(56) References Cited

U.S. PATENT DOCUMENTS

| 2005/0259142 | A1* | 11/2005 | Kwak | A61P 13/12 347/238 |
| 2012/0188290 | A1* | 7/2012 | Park | G11C 19/184 345/211 |
| 2019/0005884 | A1* | 1/2019 | Yoo | G06F 3/011 |
| 2019/0181211 | A1* | 6/2019 | Bae | G09G 3/3233 |

\* cited by examiner

*Primary Examiner* — Sanghyuk Park
(74) *Attorney, Agent, or Firm* — POLSINELLI PC (57) ABSTRACT

A display panel sets a focus area per frame, based on focus area setting information and focus area reference line information received from the outside, control the number of gate lines simultaneously driven according to the focus area, and display a rendered image per focus area, thereby preventing the quality degradation of the image perceived by the user and increasing the frame rate of the display panel, and enhancing the quality of the virtual reality experience provided by the virtual reality device.

11 Claims, 9 Drawing Sheets

DISPLAY DEVICE AND VIRTUAL REALITY DEVICE

CROSS-REFERENCE TO RELATED APPLICATION

This application claims priority from Korean Patent Application No. 10-2021-0172777, filed on Dec. 6, 2021, which is hereby incorporated by reference in its entirety.

BACKGROUND

Field of the Disclosure

Aspects of the disclosure relate to a display device and a virtual reality device.

Description of the Background

The virtual reality device may provide a virtual reality experience to the user by displaying an image associated with a virtual object through a display device.

To enhance the quality of the virtual reality experience provided to the user by the virtual reality device, it is necessary to increase the frame rate of the image displayed by the display device included in the virtual reality device.

SUMMARY

Accordingly, the present disclosure is directed to a display device and a virtual reality device that substantially obviate one or more of problems due to limitations and disadvantages described above.

More specifically, the present disclosure is to provide a method for increasing the frame rate of a display device included in a virtual reality device and enhancing the quality of a virtual reality experience provided through the virtual reality device.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a display device includes a plurality of subpixels disposed on a substrate and including a light emitting element, a plurality of gate lines supplying a scan signal to the plurality of subpixels, a gate driving circuit configured to drive the plurality of gate lines, a focus area setting circuit configured to receive focus area setting information and focus area reference line information and set at least one piece of focus area boundary information, and a gate control circuit configured to set a number of the gate lines where the scan signal is simultaneously supplied by the gate driving circuit in each of a plurality of horizontal periods of a frame period based on the focus area setting information and the at least one piece of focus area boundary information.

In another aspect of the present disclosure, a display device includes a plurality of subpixels disposed on a substrate and including a light emitting element, a plurality of gate lines supplying a scan signal to the plurality of subpixels, a plurality of emission control lines controlling an emission period of the light emitting element included in the plurality of subpixels, and a plurality of emission control switches electrically connected with the plurality of emission control lines, respectively, and positioned outside the plurality of subpixels, wherein the scan signal is configured to be simultaneously supplied to N (N is an integer meeting N>2) adjacent gate lines among the plurality of gate lines in a first horizontal period of a frame period, and wherein N emission control switches electrically connected with N emission control lines corresponding to the N gate lines are configured to be simultaneously turned on and simultaneously turned off.

In a further aspect of the present disclosure, a virtual reality device includes a silicon substrate, a plurality of subpixels disposed on the substrate and including a light emitting element, a plurality of gate lines supplying a scan signal to the plurality of subpixels, a focus area setting circuit disposed on the silicon substrate and configured to receive focus area setting information and focus area reference line information and set at least one piece of focus area boundary information, and a gate control circuit disposed on the silicon substrate and configured to set a number of the gate lines where the scan signal is simultaneously supplied in each of a plurality of horizontal periods of a frame period based on the focus area setting information and the at least one piece of focus area boundary information.

According to various aspects of the present disclosure, the frame rate of the display device can be increased and the quality of the virtual reality experience provided through the virtual reality device can be improved by varying focus area boundary information according to focus area reference line information received before a frame period and adjusting the scheme of driving the gate line disposed in each area set according to the focus area boundary information.

It is to be understood that both the foregoing general description and the following detailed description are exemplary and explanatory and are intended to provide further explanation of the disclosure as claimed.

DESCRIPTION OF DRAWINGS

The above and other features and advantages of the disclosure will be more clearly understood from the following detailed description, taken in conjunction with the accompanying drawings, in which.

DETAILED DESCRIPTION

In the following description of examples or aspects of the disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the disclosure, detailed descriptions of well-known functions and components incorporated herein will be omitted when it is determined that the description may make the subject matter in some aspects of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various aspects of the disclosure will be described in detail with reference to accompanying drawings.

Figure 1:
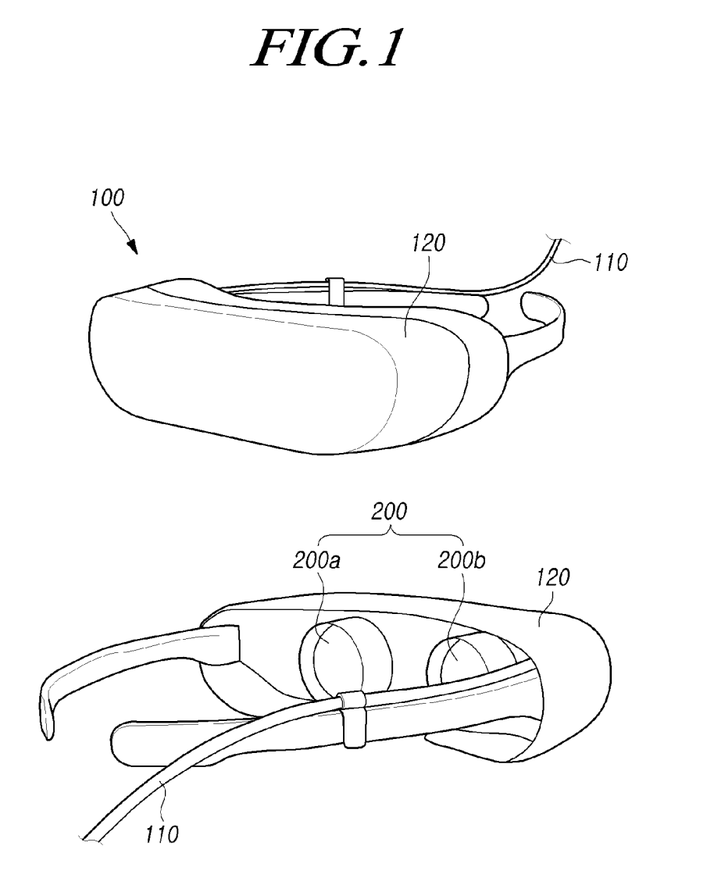
FIG. 1 is a view illustrating an example of a virtual reality device according to aspects of the present disclosure.
Figure 2:
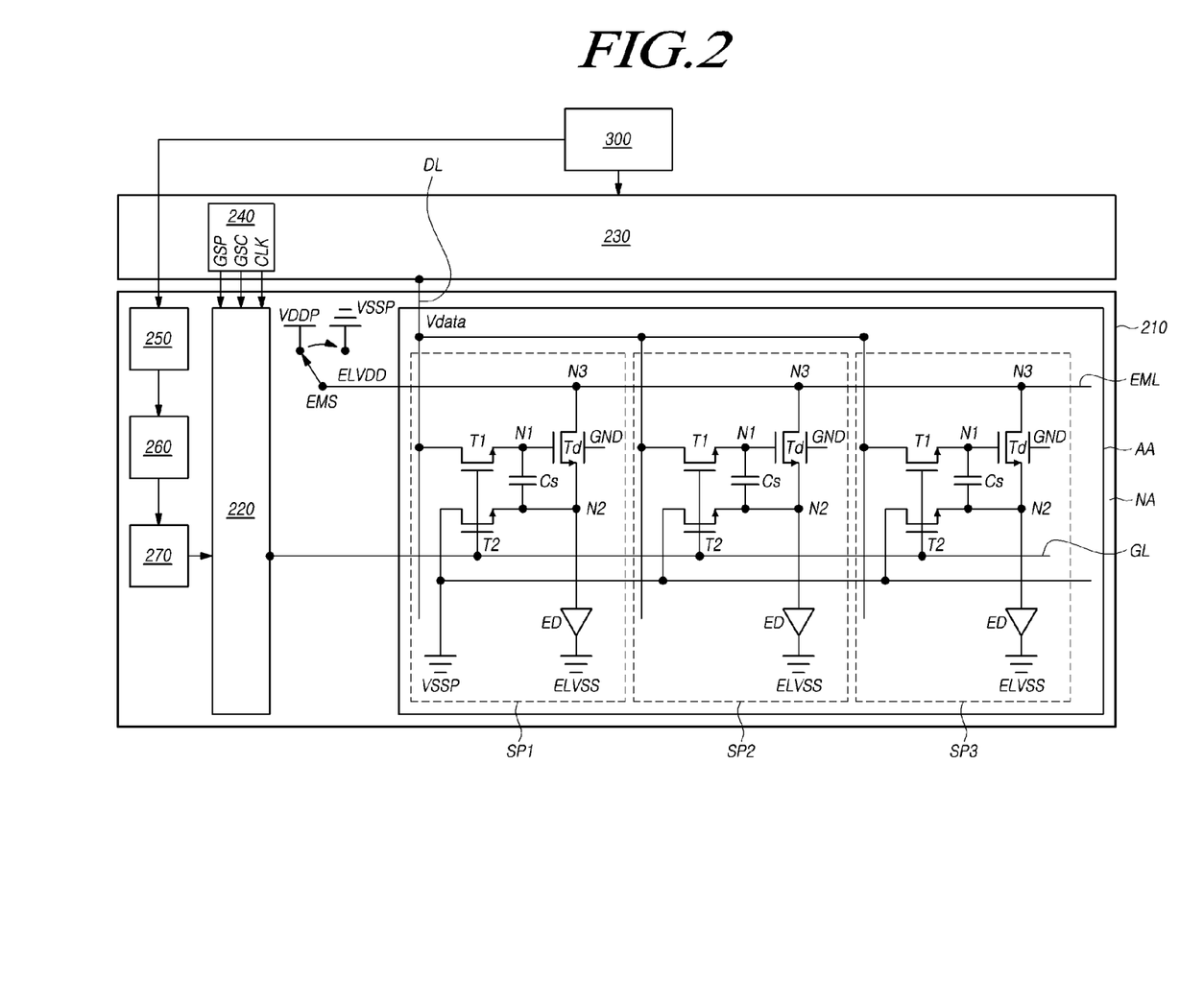
FIG. 2 is a view illustrating an example of a configuration of a display device according to aspects of the present disclosure.

FIG. 1 is a view illustrating an example of a virtual reality device 100 according to aspects of the present disclosure. FIG. 2 is a view illustrating an example of a configuration of a display device 200 according to aspects of the present disclosure.

FIG. 1 exemplarily illustrates a headset-type virtual reality device 100. The virtual reality device 100 may provide a virtual reality image to the user. Although the virtual reality device 100 is described as an example in the aspects of the disclosure, the aspects of the disclosure may also be applicable to augmented reality devices.

The virtual reality device 100 may include an image signal input line 110 to which an image signal is input. The virtual reality device 100 may include at least one display device 200 that displays an image. The virtual reality device 100 may include an image signal input line 110 and a case 120 receiving the display device 200.

The image signal input line 110 may transfer the image data transmitted from the outside (e.g., a terminal or a server) to the display device 200. The image signal input line 110 may transfer the control signal transmitted from the outside to the display device 200.

The image signal input line 110 may not be included in the virtual reality device 100 when the virtual reality device 100 receives image data or a control signal through wireless communication. The virtual reality device 100 may include a wireless communication module and receive the image data and control signal through the wireless communication module and transfer them to the display device 200.

The display device 200 may display an image corresponding to the image data received from the outside.

The virtual reality device 100 may include one display device 200 or, as shown in FIG. 1 as an example, two display devices 200a and 200b.

The two display devices 200a and 200b may include, e.g., a first display device 200a that displays a left-eye image and a second display device 200b that displays a right-eye image.

By displaying the left-eye image and the right-eye image through the first display device 200a and the second display device 200b, a virtual reality or augmented reality image may be provided to the user. Each of the two display devices 200a and 200b may include a configuration for displaying an image. In some cases, the two display devices 200a and 200b may further include an optical device for transferring the displayed image to the user.

The display device 200 included in the virtual reality device 100 may be one of various types of display devices 200, e.g., a liquid crystal display device, an organic light emitting display device, an inorganic light emitting display device, or the like.

The display device 200 may have various elements and signal lines disposed on a glass substrate or a plastic substrate.

Alternatively, the display device 200 may have various elements and signal lines disposed on a silicon substrate. The display device 200 may be implemented to be compact by having various elements and signal lines disposed on a silicon substrate. Various circuits for driving the display device 200 may be easily implemented by directly disposing various circuits on the silicon substrate.

Referring to FIG. 2, the display device 200 may include a display panel 210 having a plurality of gate lines GL, a plurality of data lines DL, and a plurality of subpixels SP disposed on the display panel 210. The display panel 210 may include an active area AA in which subpixels SP are disposed to display an image and a non-active area NA positioned outside the active area AA.

The display device 200 may have various elements and signal lines disposed on a silicon substrate.

The display device 200 may include a gate driving circuit 220 and a data driving circuit 230 for driving the plurality of subpixels SP. The display device 200 may include a controller for controlling the gate driving circuit 220 and the data driving circuit 230.

The gate driving circuit 220 may be integrated and disposed on a silicon substrate.

The gate driving circuit 220 may supply a scan signal to the subpixel SP through the gate line GL. The gate driving circuit 220 may control the driving timing of the subpixel SP by the scan signal.

The gate driving circuit 220 may control driving of the emission control line EML for controlling the emission period of the subpixel SP. In this case, the emission control switch EMS electrically connected to the emission control line EML may be positioned inside the gate driving circuit 220.

The data driving circuit 230 may receive image data and convert it into an analog data voltage Vdata. The data driving circuit 230 may output the data voltage Vdata to the data line DL according to the timing at which the scan signal is applied through the gate line GL. Each subpixel SP may display the brightness according to the image data by the data voltage Vdata.

Each of the plurality of subpixels SP driven by one gate line GL may be driven by a separate data line DL, but as illustrated in FIG. 2, two or more subpixels SP may be driven by one data line DL.

For example, a first subpixel SP1, a second subpixel SP2, and a third subpixel SP3 may be driven by one data line DL. Each of the three subpixels SP1, SP2, and SP3 may emit light of a different color. Supply of the data voltage Vdata to the three subpixels SP1, SP2, and SP3 may be controlled by a demultiplexer included in the data driving circuit 230.

The data driving circuit 230 may be integrated and disposed on a silicon substrate like the gate driving circuit 220. Alternatively, as illustrated in FIG. 2, the data driving circuit 230 may be positioned outside the silicon substrate.

Each of the plurality of subpixels SP may include a light emitting element ED and at least one circuit element.

For example, the subpixel SP may include a first transistor T1, a second transistor T2, a driving transistor Td, and a storage capacitor Cs.

The first transistor T1 may be electrically connected between the data line DL and the first node N1. The first node N1 may be the gate node of the driving transistor Td.

The first transistor T1 may be controlled by the scan signal supplied through the gate line GL. The first transistor T1 may control application of the data voltage Vdata to the first node N1.

The second transistor T2 may be electrically connected between the reference voltage VSSP and the second node N2. The second node N2 may be a source node or drain node of the driving transistor Td.

The second transistor T2 may be controlled by the scan signal supplied through the gate line GL. The gate line GL controlling the second transistor T2 may be identical to or different from the gate line GL controlling the first transistor T1. The second transistor T2 may control application of the reference voltage VSSP to the second node N2.

The driving transistor Td may be electrically connected between the second node N2 and the third node N3. The second node N2 may be a node electrically connected to the light emitting element ED. The third node N3 may be the drain node or source node of the driving transistor Td.

The third node N3 may be a node to which the first driving voltage VDDP is supplied. The first driving voltage VDDP may be a high potential driving voltage.

The driving transistor Td may be controlled according to the voltage applied to the first node N1. The driving transistor Td may supply a driving current to the light emitting element ED according to the data voltage Vdata applied to the first node N1 and the reference voltage VSSP applied by the second node N2.

The driving transistor Td may include a grounded back gate electrode. Since the back gate electrode is grounded, the output characteristics of the driving current supplied by the driving transistor Td may be stable.

The storage capacitor Cs may be electrically connected between the first node N1 and the second node N2. The storage capacitor Cs may maintain a difference between the voltage of the first node N1 and the voltage of the second node N2 during one frame period.

If the scan signal is supplied through the gate line GL, the first transistor T1 and the second transistor T2 may be turned on, and the data voltage Vdata and the reference voltage VSSP may be applied to the first node N1 and the second node N2, respectively.

Thereafter, the emission control switch EMS may be turned on so that the first driving voltage ELVDD may be supplied to the third node N3. The emission control switch EMS may be connected to each emission control line EML and be positioned outside the subpixel SP. Since the emission control switch EMS is connected to each emission control line EML, it is possible to easily control the emission period of the subpixel SP. Since the emission control switch EMS is positioned outside the subpixel SP, the aperture ratio of the subpixel SP may be increased.

If the first driving voltage ELVDD is supplied according to the driving of the emission control switch EMS, the driving transistor Td may supply the driving current to the light emitting element ED according to the voltage applied to the first node N1 and the second node N2.

The light emitting element ED may be electrically connected between the second node N2 and a line to which a second driving voltage ELVSS is applied. The second driving voltage ELVSS may be a low potential driving voltage.

The light emitting element ED may display a brightness according to the driving current supplied by the driving transistor Td. The light emitting element ED may be an organic light emitting diode or an inorganic light emitting diode. In the aspects of the disclosure, the display device 20 is an electroluminescent display device, but the aspects of the disclosure may also be applied to other types of display devices, e.g., liquid crystal displays.

The controller may be disposed on a silicon substrate or may be positioned outside the silicon substrate.

The controller may receive, from the outside (e.g., the host 300), various timing signals including a vertical synchronization signal VSYNC, a horizontal synchronization signal HSYNC, an input data enable signal DE, and a clock signal, along with the image data.

The host 300 may be included in the virtual reality device 100. The host 300 may transmit image data and various control signals to the display device 200. In some cases, the host 300 may be configured to be included in the display device 200.

The controller may generate various control signals according to various timing signals received from the outside. The controller may output various control signals to the gate driving circuit 220 and the data driving circuit 230.

As an example, to control the gate driving circuit 220, the controller may output various gate control signals including a gate start pulse GSP, a gate shift clock GSC, and a gate output enable signal GOE to the gate driving circuit 220.

Various gate control signals may be transferred to the gate driving circuit 220 through the gate signal supply circuit 240. The gate signal supply circuit 240 may be positioned outside the silicon substrate like the data driving circuit 230 and, in some cases, may be disposed on a silicon substrate.

The gate start pulse GSP may control the operation start timing of the gate driving circuit 220. The gate shift clock GSC may control the shift timing of the scan signal. The gate output enable signal GOE may designate timing information about the gate driving circuit 220.

To control the data driving circuit 230, the controller may output various data control signals including, e.g., a source start pulse SSP, a source sampling clock SSC, and a source output enable signal SOE, to the data driving circuit 230.

The source start pulse SSP may control the data sampling start timing of the data driving circuit 230. The source sampling clock SSC may control the data sampling timing of the data driving circuit 230. The source output enable signal SOE may control the output timing of the data driving circuit 230.

As illustrated in FIG. 2, when the data driving circuit 230 is positioned outside the silicon substrate, the data driving circuit 230 may be controlled according to the data control signal transmitted from the host 300.

The display device 200 may further include a power management integrated circuit that supplies various voltages or currents to, e.g., the display panel 210, the gate driving circuit 220, and the data driving circuit 230 or controls various voltages or currents to be supplied.

The display device 200 may further include a command interface 250, a focus area setting circuit 260, and a gate control circuit 270 for controlling a driving scheme of the gate driving circuit 220 according to a control signal received from the outside. The focus area setting circuit 260 and the gate control circuit 270 may be implemented to be disposed on a silicon substrate.

The display device 200 may further include a sensor for detecting the user's gaze direction with respect to the display panel 210. The sensor may be included in the display device 200 and, in some cases, may be included in the virtual reality device 100.

The display device 200 may set a different scheme for the gate driving circuit 220 to control the gate line GL according to the user's gaze direction, increasing the frame rate of the image displayed through the display panel 210 without image degradation recognized by the user.

Figure 3:
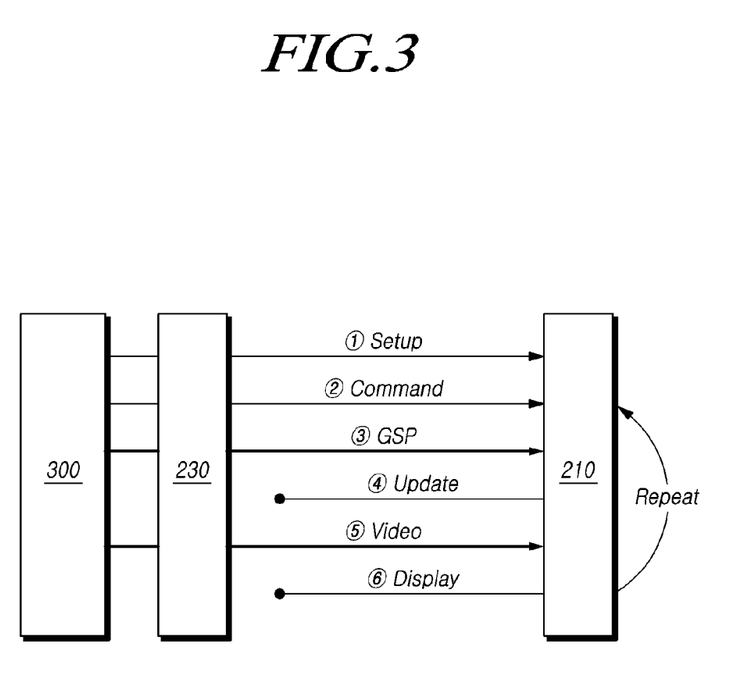
FIG. 3 is a view illustrating an example of a method for driving a display device according to aspects of the present disclosure.

FIG. 3 is a view illustrating an example of a method for driving a display device 200 according to aspects of the present disclosure. FIGS. 4 to 7 are views illustrating an example of a scheme for driving a display device 200 according to aspects of the present disclosure.

Referring to FIGS. 2 and 3, the display panel 210 may control to differ in the scheme for displaying an image according to the area in each frame according to the control signal and command received from the outside.

For example, the display panel 210 may set a scheme for displaying an image for each frame according to the control signal and command received from the host 300.

Alternatively, the display panel 210 may adjust the scheme for displaying an image per frame according to the control signal and command received from the controller. Although a scheme in which the display panel 210 is driven according to the control signal and command received from the host 300 is described below for convenience of description, the aspects of the disclosure may also be applied even when the display panel 210 is controlled by the controller.

The display panel 210 may receive focus area setting information from the outside ((①) Setup).

The focus area setting circuit 260 disposed on the display panel 210 may receive focus area setting information from the outside through the command interface 250.

The command interface 250 may mean a module form or may also mean a boundary between external circuits that transmit a control signal and a command to the focus area setting circuit 260.

The command interface 250 may be, e.g., a serial peripheral interface (SPI) or an inter-integrated circuit (I2C). The command interface 250 may be directly connected to the host 300. The command interface 250 may directly receive a control signal and a command from the host 300.

In some cases, the command interface 250 may receive a control signal and a command through a signal line connected to the data driving circuit 230 positioned outside the display panel 210. In this case, the interface between the host 300 and the data driving circuit 230 may be a mobile industry processor interface (MIPI).

The focus area setting information may include at least one of a focus area driving mode value, a focus area size value, and a focus area compression ratio value.

The focus area driving mode value may be a value indicating whether to drive the focus area of the display panel 210. Depending on the focus area driving mode value, the display panel 210 may be driven in a normal mode and may be driven in a focus area driving mode.

When the display panel 210 is driven in the focus area driving mode, the display panel 210 may include two or more areas driven in different schemes in each frame.

The focus area size value may be a value indicating the size of the focus area FR.

The focus area FR may be an area differentiated according to the user's gaze direction with respect to the display panel 210. The focus area FR may be an area that is differentiated and driven differently according to the user's gaze direction. By applying a different driving scheme to each focus area FR, it is possible to prevent degradation of image quality and increase the frame rate of the image displayed by the display panel 210.

Figure 4:
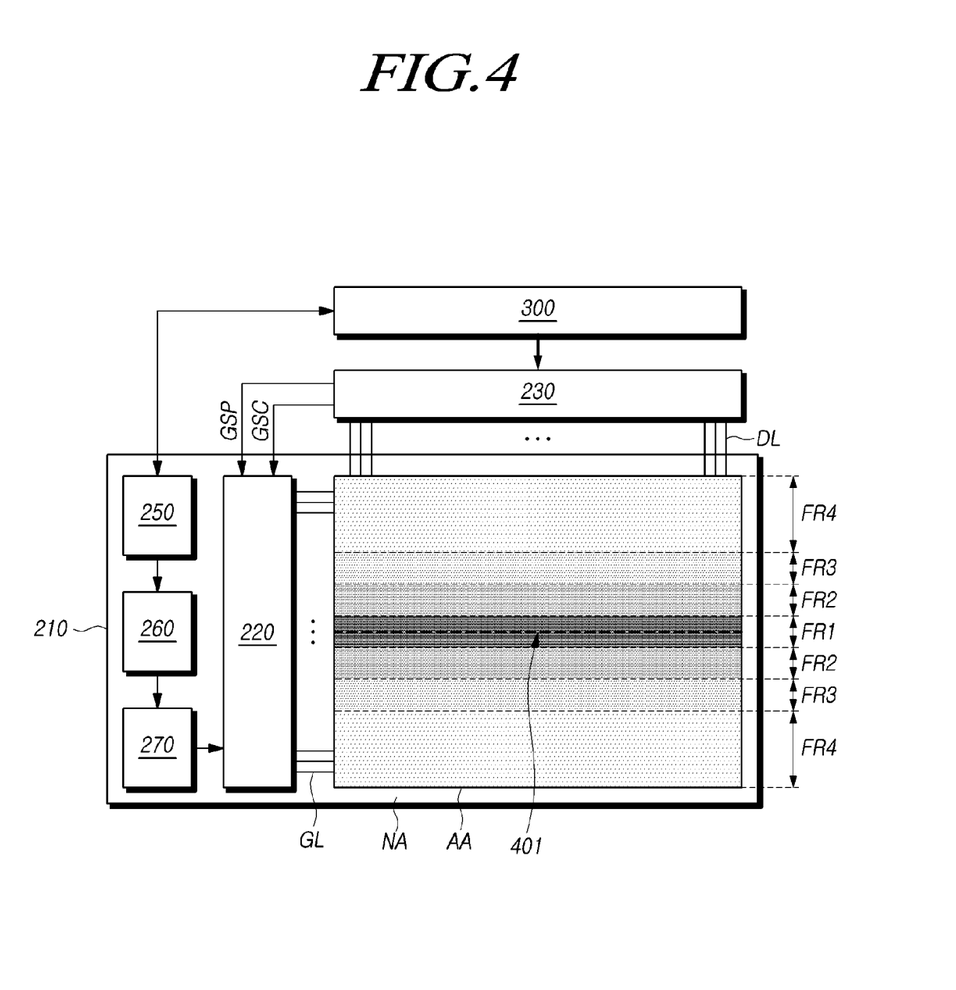
FIGS. 4, 5, 6, and 7 are views illustrating an example of a scheme for driving a display device according to aspects of the present disclosure.

For example, referring to FIG. 4, the focus area FR may include a first focus area FR1, a second focus area FR2, a third focus area FR3, and a fourth focus area FR4.

The focus area size value may be a value indicating the size of each focus area FR. The number of focus area size values may be smaller than the number of focus areas FR.

For example, as in the example illustrated in FIG. 4, when the number of focus areas FR is four, the number of focus area size values may be three. The focus area size values may include a size value of the first focus area FR1, a size value of the second focus area FR2, and a size value of the third focus area FR3. The size of the fourth focus area FR4 may not be designated by the focus area size value, and remaining area except for the focus areas FR in the active area AA may be the fourth focus area FR4.

The focus area compression ratio value may be a value indicating the compression ratio for each focus area FR. The driving scheme of each focus area FR may be determined according to a focus area compression ratio value.

For example, the focus area compression ratio value for the first focus area FR1 may be 1:1. The focus area compression ratio value for the second focus area FR2 may be 2:1. The focus area compression ratio value for the third focus area FR3 may be 3:1. The focus area compression ratio value for the fourth focus area FR4 may be 4:1.

The number of gate lines GL simultaneously driven in each focus area FR may be set according to the focus area compression ratio value for each focus area FR.

For example, each of the plurality of gate lines GL disposed in the first focus area FR1 may be driven in a separate period during the frame period.

Every two of the plurality of gate lines GL disposed in the second focus area FR2 may be driven simultaneously. Every three of the plurality of gate lines GL disposed in the third focus area FR3 may be driven simultaneously. Every four of the plurality of gate lines GL disposed in the fourth focus area FR4 may be driven simultaneously.

Since two or more gate lines GL are simultaneously driven in some areas, the overall period of the frame may be reduced. The frame rate of the image displayed by the display panel 210 may be increased.

The display panel 210 may set a focus area FR for each frame. The focus area FR may be set based on focus area boundary information. The focus area boundary information may be set based on the focus area setting information and the focus area reference line information.

Referring to FIGS. 2 to 4, the display panel 210 may receive the focus area reference line information before the start of the frame period (②Command).

The focus area reference line information may be a value indicating a point corresponding to the user's gaze direction with respect to the display panel 210.

The focus area reference line information may be a value indicating the gate line GL or the subpixel SP row positioned at the point corresponding to the user's gaze direction. Alternatively, the focus area reference line information may be a point corresponding to the user's gaze direction and may be a value indicating between two adjacent gate lines GL or two adjacent subpixel SP rows.

For example, the portion indicated by 401 illustrated in FIG. 4 may be a portion corresponding to the focus area reference line.

The focus area setting circuit 260 disposed on the display panel 210 may set at least one piece of focus area boundary information based on the focus area reference line information received before the frame period and the focus area size value included in the focus area setting information.

For example, the reference line value according to the focus area reference line information may be X, and the focus area size value of the first focus area FR1, the focus area size value of the second focus area FR2, and the focus area size value of the third focus area FR3 may be a, b, and c, respectively.

In this case, focus area boundary information a1 and a2 for the first focus area FR1 may be X+a/2 and X−a/2, respectively. a1 may be the value indicating the upper boundary of the first focus area FR1, and a2 may be the value indicating the lower boundary of the first focus area FR1.

The focus area boundary information b1 and b2 for the second focus area FR2 may be a1+b (=(X+a/2)+b) and a2−b (=(X−a/2)−b), respectively. b1 may be the value indicating the upper boundary of the second focus area FR2, and b2 may be the value indicating the lower boundary of the second focus area FR2.

The focus area boundary information c1 and c2 for the third focus area FR3 may be b1+c (=(X+a/2)+b+c) and b2−c (=(X−a/2)−b−c), respectively.

Based on the focus area boundary information for the first focus area FR1, the second focus area FR2, and the third focus area FR3, the first focus area FR1, the second focus area FR2, a third focus area FR3, and a fourth focus area FR4 may be determined.

The focus area setting circuit 260 may receive the focus area reference line information from the host 300 before the frame period and then receive the gate start pulse GSP (③ GSP).

If receiving the gate start pulse GSP, the focus area setting circuit 260 may generate or update the focus area boundary information using the focus area reference line information received before the frame period and the focus area size value included in the pre-stored focus area setting information. (④ Update).

Alternatively, upon receiving the vertical synchronization signal VSYNC from the host 300, the focus area setting circuit 260 may generate or update focus area boundary information based on pre-stored information.

A focus area FR may be set according to focus area reference line information received before each frame period. The focus area FR may be changed in accordance with a change in the reference line value according to the user's gaze direction.

The host 300 may transmit image data rendered according to the focus area FR to the display panel 210 (⑤ Video).

The display panel 210 may drive each focus area FR according to the focus area compression ratio value for each focus area FR while displaying the rendered image (⑥ Display).

The gate control circuit 270 may control driving of the gate driving circuit 220 according to the focus area boundary information set by the focus area setting circuit 260.

The gate control circuit 270 may control the gate driving circuit 220 to adjust the number of gate lines GL simultaneously driven in each focus area FR.

By adjusting the number of gate lines GL simultaneously driven in each focus area FR to differ, it is possible to increase the frame rate while preventing quality degradation of the image recognized by the user.

For example, referring to FIG. 4, each of the plurality of gate lines GL disposed in the first focus area FR1 set according to the focus area reference line information may be driven in a separate period in the frame period. Period when the scan signals are supplied to the plurality of gate lines GL may be divided.

The plurality of subpixels SP respectively driven by the plurality of gate lines GL disposed in the first focus area FR1 may be driven according to the data voltage Vdata supplied to each subpixel SP, displaying an image.

Every two of the plurality of gate lines GL disposed in the second focus area FR2 may be driven simultaneously in the frame period. A scan signal may be simultaneously supplied to the two gate lines GL.

Among the plurality of subpixels SP disposed in the second focus area FR2 and driven by two gate lines GL simultaneously driven, the subpixels SP driven by the same data line DL may be driven by the same data voltage Vdata. The data voltage Vdata may be a voltage according to image data rendered for driving the two subpixels SP.

The compression ratio of image data corresponding to the second focus area FR2 may increase, and the resolution of the image displayed in the second focus area FR2 may decrease.

Every three of the plurality of gate lines GL disposed in the third focus area FR3 may be driven simultaneously in the frame period. A scan signal may be simultaneously supplied to the three gate lines GL.

Among the plurality of subpixels SP disposed in the third focus area FR3 and driven by three gate lines GL simultaneously driven, the subpixels SP driven by the same data line DL may be driven by the same data voltage Vdata. The data voltage Vdata may be a voltage according to image data rendered for driving the three subpixels SP.

The compression ratio of image data corresponding to the third focus area FR3 may be larger than the compression ratio of image data corresponding to the second focus area FR2.

The resolution of the image displayed in the third focus area FR3 may be smaller than the resolution of the image displayed in the second focus area FR2.

Similarly, in the fourth focus area FR4, as compared to the third focus area FR3, a greater number of gate lines GL may be simultaneously driven to display an image. The compression ratio of image data corresponding to the fourth focus area FR4 may increase, and the resolution of the image displayed in the fourth focus area FR4 may decrease.

Based on the focus area reference line information according to the user's gaze direction, the resolution of the image is decreased away from the user's gaze direction, so that it is possible to prevent or reduce degradation of the image perceived by the user. Since an image is displayed while the number of simultaneously driven gate lines GL is different for each focus area FR, the frame period may be reduced.

Accordingly, it is possible to prevent image quality degradation and increase the frame rate, enhancing the quality of the virtual reality experience provided by the virtual reality device 100.

The focus area FR may be newly set in every frame, and the focus area FR may be changed according to the user's gaze direction.

Figure 5:
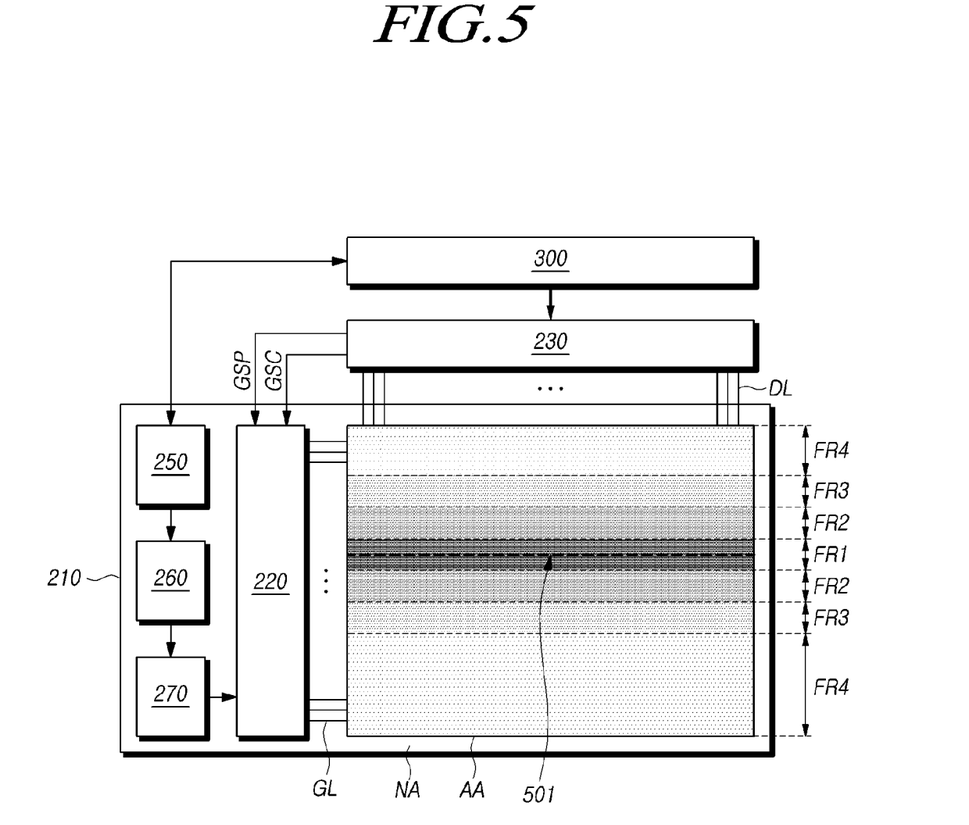
Figure 6:
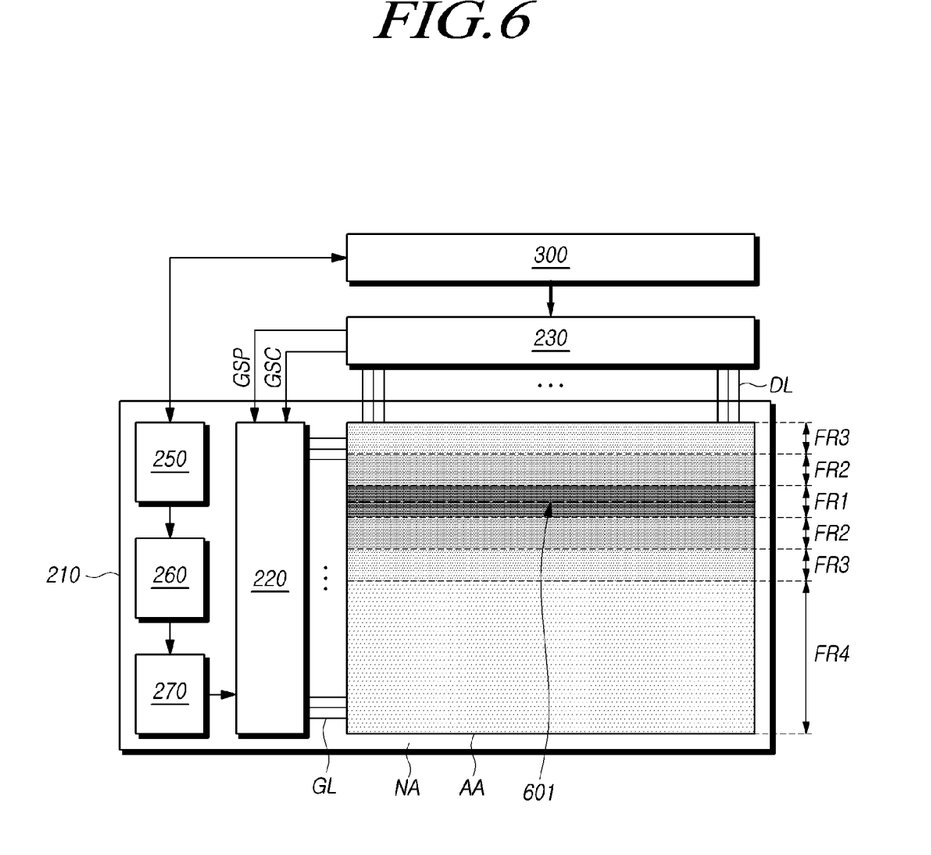

Referring to FIGS. 5 and 6, the focus area reference line information according to the user's gaze direction may be changed as shown in 501 and 601.

The focus area setting circuit 260 of the display panel 210 may receive focus area reference line information before the start of the frame period and, if the gate start pulse GSP is input, update the focus area boundary information.

If the focus area reference line information is changed like the portion indicated by 501 shown in FIG. 5, each focus area FR1, FR2, FR3, and FR4 in the corresponding frame may be set to differ from that in the previous frame.

For example, since the reference line value according to the focus area reference line information moves to the upper side of the active area AA, the first focus area FR1, the second focus area FR2, and the third focus area FR3 may move to the upper side of the active area AA while maintaining the area size.

The fourth focus area FR4 positioned at the upper side of the active area AA may decrease, and the fourth focus area FR4 positioned at the lower side of the active area AA may increase.

The gate control circuit 270 of the display panel 210 may set the driving of the gate driving circuit 220 to differ according to the focus area FR changed in the corresponding frame.

Further, if the focus area reference line information is changed like the portion indicated by 601 shown in FIG. 6, in a similar manner, each focus area FR1, FR2, FR3, and FR4 in the corresponding frame may be set to differ from that in the previous frame.

As the reference line value moves according to the focus area reference line information, the fourth focus area FR4 may not be positioned at the upper side of the active area AA.

The size of the fourth focus area FR4 positioned at the lower side of the active area AA may increase.

As illustrated in FIG. 6, when the fourth focus area FR4 is not positioned at the upper side of the active area AA, the size of the third focus area FR3 may vary depending on the case.

As an example, the size of the third focus area FR3 set according to the focus area boundary information for the second focus area FR2 at the upper side of the active area AA may be smaller than the size value of the third focus area FR3 according to the focus area size value included in the focus area setting information.

The size of the third focus area FR3 positioned below the focus area reference line information may be set to be the same as the size of the third focus area FR3 positioned above the focus area reference line information.

The areas spaced apart by the same distance from the reference line value according to the focus area reference line information may maintain the same resolution.

Figure 7:
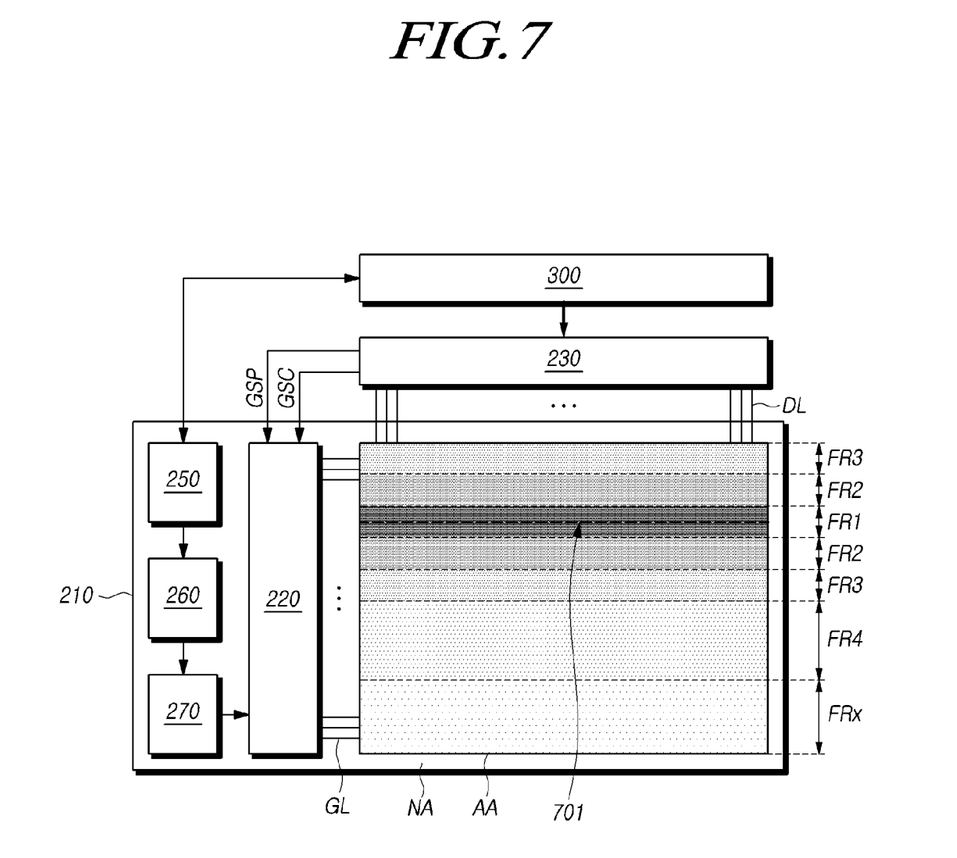

If the reference line value according to the focus area reference line information is positioned adjacent to one side of the active area AA, the focus area FR adjacent to the other side of the active area AA may further include an additional area.

Referring to FIG. 7, the reference line value according to the focus area reference line information may be adjacent to the upper side of the active area AA like the portion indicated by 701.

The focus area setting circuit 260 may set the first focus area FR1, the second focus area FR2, the third focus area FR3, and the fourth focus area FR4 based on the focus area reference line information received before the frame period and the focus area size value included in the focus area setting information. Further, the focus area setting circuit 260 may further set an additional focus area FRx positioned between the boundary of the fourth focus area FR4 and the boundary of the active area AA.

The additional focus area FRx may be an area that is driven according to a higher compression ratio value than the fourth focus area FR4 and displays an image.

When the reference line value according to the focus area reference line information is positioned very adjacent to one side of the active area AA or the fourth focus area FR4 set according to the focus area reference line information exceeds a certain size, the additional focus area FRx may be set between the fourth focus area FR4 and the active area AA. The frame rate may be further increased by setting the additional focus area FRx. In this case, the focus area size value included in the focus area setting information for setting the fourth focus area FR4 may include the size value of the fourth focus area FR4.

The above-described focus area driving scheme may be implemented as the gate control circuit 270 controls the driving of the gate driving circuit 220 according to the focus area FR set by the focus area setting circuit 260.

Further, the driving of the emission control line EML controlling the emission period of the subpixel SP and the gate line GL and the driving timing of the subpixel SP may be controlled by the gate driving circuit 220.

Figure 8:
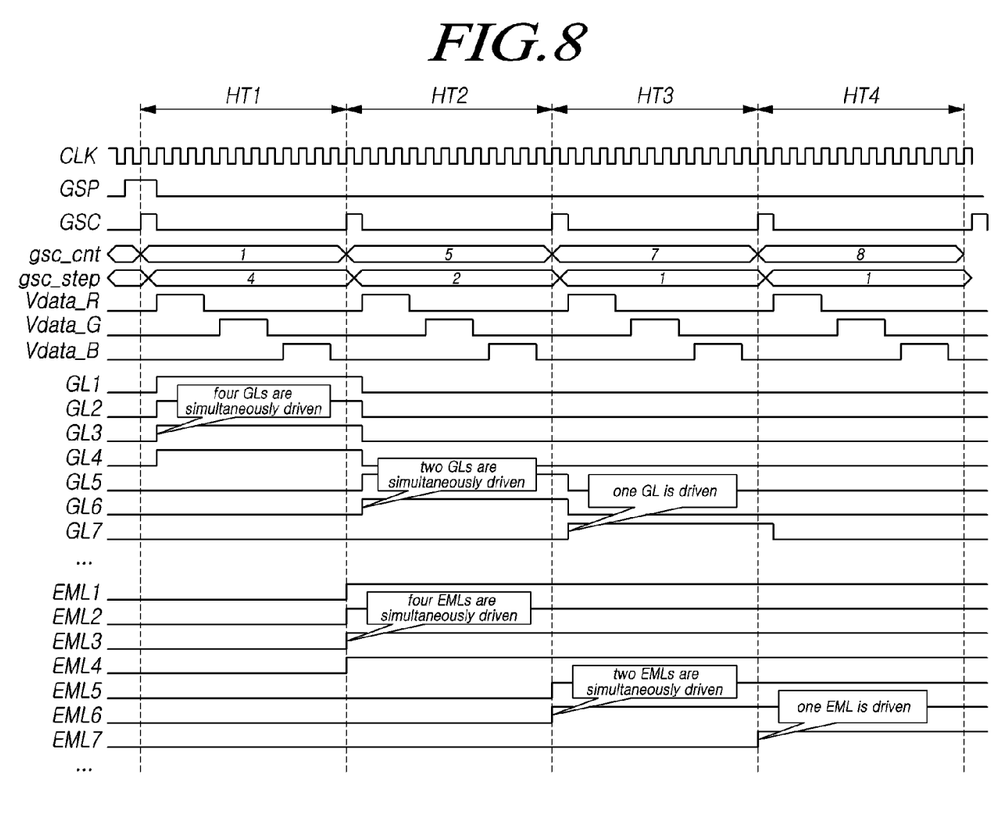
FIGS. 8 and 9 are views illustrating an example of a scheme for driving a gate line and an emission control line of a display device according to aspects of the present disclosure.
Figure 9:
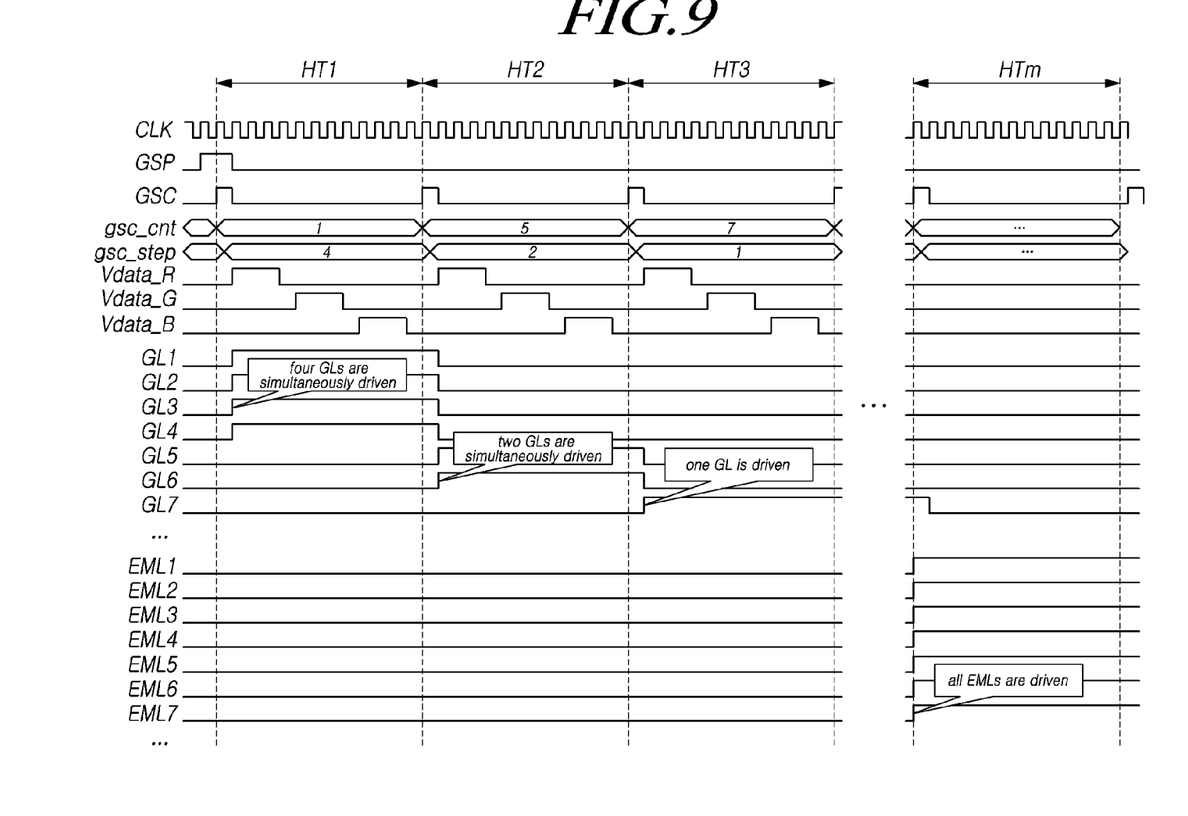

FIGS. 8 and 9 are views illustrating an example of a scheme for driving a gate line GL and an emission control line EML of a display device 200 according to aspects of the present disclosure.

Referring to FIG. 8, an example of timing of a scan signal and an emission control signal in a horizontal period HT included in one frame period is shown. For convenience of description, a case in which the focus areas FR driven by different driving schemes are positioned corresponding to each horizontal period HT is exemplified.

When a gate start pulse GSP is input, focus area boundary information may be set by the focus area setting circuit 260.

The gate control circuit 270 may control the number of gate lines GL and emission control lines EML driven simultaneously in each focus area FR according to the focus area compression rate value corresponding to each focus area FR and the focus areas FR set according to the focus area boundary information.

For example, the gate control circuit 270 may set the gate shift clock count gsc_cnt to 1 according to the gate shift clock GSC in the first horizontal period HT1 and set the gate shift clock step gsc_step to 4.

The gate shift clock count gsc_cnt may be a value indicating the driven gate line GL. The gate shift clock step gsc_step may be a value indicating the number of gate lines GL simultaneously driven according to the focus area compression ratio value.

When the value of the focus area compression ratio for the focus area FR driven in the first horizontal period HT1 is 4:1, the gate shift clock step gsc_step may be set to 4. Since the timing is driven from the first gate line GL1, the gate shift clock count gsc_cnt may be set to 1.

A scan signal may be simultaneously supplied to the four gate lines GL1, GL2, GL3 and GL4 in the first horizontal period HT1 according to the gate shift clock count gsc_cnt and the gate shift clock step gsc_step.

In the first horizontal period HT1, data voltages Vdata_R, Vdata_G, and Vdata_B according to the rendered image data for the subpixels SP driven by the four gate lines GL1, GL2, GL3, and GL4 may be sequentially supplied. FIG. 8 illustrates a case where three subpixels SP are driven by the same data line DL controlled by a demultiplexer as in the example described in connection with FIG. 2, and three data voltages Vdata_R, Vdata_G, and Vdata_B may be sequentially supplied.

In the first horizontal period HT1, the four gate lines GL1, GL2, GL3, and GL4 may be simultaneously driven, and the data voltage Vdata may be supplied to the subpixel SP. Thereafter, the four emission control lines EML1, EML2, EML3, and EML4 may be simultaneously driven, and the subpixel SP driven by the four gate lines GL1, GL2, GL3 and GL4 may emit light.

The emission control switches EMS respectively electrically connected with the four emission control lines EML1, EML2, EML3, and EML4 for simultaneous driving of the four emission control lines EML1, EML2, EML3, and EML4 may be turned on simultaneously and turned off simultaneously.

The focus area compression ratio value for the focus area FR driven in the second horizontal period HT2 may be 2:1. The focus area FR driven in the second horizontal period HT2 may be an area that is further adjacent to the reference line according to the focus area reference line information than the focus area FR driven in the first horizontal period HT1 and displays an image with a higher resolution.

In the second horizontal period HT2, the gate shift clock count gsc_cnt may be set to 5, and the gate shift clock step gsc_step may be set to 2.

In the second horizontal period HT2, the gate driving circuit 220 may simultaneously supply the scan signal to the two gate lines GL5 and GL6. Thereafter, two emission control lines EML5 and EML6 corresponding to the two gate lines GL5 and GL6 may be simultaneously driven. The subpixel SP driven by the two gate lines GL5 and GL6 may emit light. The emission control switches EMS electrically connected to the two emission control lines EML5 and EML6 may be simultaneously turned on and off.

In the third horizontal period HT3 and the fourth horizontal period HT4, the gate shift clock count gsc_cnt may increase, and the gate shift clock step gsc_step may be set to 1.

In each of the third and fourth horizontal periods HT3 and HT4, one gate line GL may be driven while displaying an image. The emission control lines EML corresponding to the gate lines GL may be driven one by one as well.

The focus area FR driven in the third horizontal period HT3 and the fourth horizontal period HT4 may mean the first focus area FR1 including the reference line value according to the focus area reference line information.

As such, as the gate control circuit 270 sets the gate shift clock count gsc_cnt and the gate shift clock step gsc_sep in each horizontal period HT of the frame period based on the information set by the focus area setting circuit 260, focus area driving may be performed according to the changed focus area reference line information.

Further, it is possible to precisely display the image according to the rendered image data for each focus area FR through accurate control of the driving timing of the gate line GL and the emission control line EML corresponding to the gate line GL.

Further, for accurate control of the emission period, after supply of the data voltage Vdata according to the image data to each subpixel SP in the frame period is completed, all of the emission control lines EML may simultaneously be driven to display an image.

Referring to FIG. 9, the gate line GL may be driven according to the focus area FR set according to the focus area setting information and the focus area reference line information in each horizontal period HT. The data voltage Vdata according to the image data rendered according to the focus area FR in each horizontal period HT may be supplied to the subpixel SP.

After the gate lines GL disposed in all the focus areas FR are driven so that the supply of the data voltage Vdata is completed in the frame period, the emission control lines EML disposed in all the focus areas FR may simultaneously be driven. The subpixels SP disposed in each focus area FR included in the active area AA may simultaneously emit light. Each focus area FR may display the image corresponding to the rendered image data according to focus area driving.

The emission control switches EMS respectively electrically connected to the plurality of emission control lines EML may be simultaneously turned on and off.

After the supply of the data voltage Vdata according to the driving of the gate line GL is completed, the emission control switches EMS are simultaneously driven, rendering it possible to easily adjust the timing of the emission period of the subpixel SP driven by each emission control line EML.

By precisely controlling the emission period, it is possible to prevent or reduce the degradation of quality perceived by the user for the image displayed according to focus area driving.

The foregoing aspects are briefly described below.

A display device 200 according to aspects of the disclosure may comprise a plurality of subpixels SP disposed on a substrate and including a light emitting element ED, a plurality of gate lines GL supplying a scan signal to the plurality of subpixels SP, a gate driving circuit 220 configured to drive the plurality of gate lines GL, a focus area setting circuit 260 configured to receive focus area setting information and focus area reference line information and set at least one piece of focus area boundary information, and a gate control circuit 270 configured to set a number of the gate lines GL where the scan signal is simultaneously supplied by the gate driving circuit 220 in each of a plurality of horizontal periods HT of a frame period based on the focus area setting information and the at least one piece of focus area boundary information.

The focus area setting information may include at least one of a focus area driving mode value, a focus area size value, and a focus area compression ratio value.

The at least one piece of focus area boundary information may be calculated based on the focus area reference line information and the focus area size value.

The at least one piece of focus area boundary information may be calculated and set if a gate start pulse GSP is input.

A number of focus area size values may be smaller than a number of focus area compression ratio values.

The number of the gate lines GL where the scan signal is simultaneously supplied in each area set by the at least one piece of focus area boundary information may be determined based on the focus area compression ratio value corresponding to each area.

The focus area setting circuit 260 may be configured to receive the focus area reference line information before the frame period starts.

The focus area reference line information may include a reference line value indicating between two adjacent gate lines GL among the plurality of gate lines GL or indicating at least one of the two adjacent gate lines GL.

The focus area setting circuit 260 may be configured to receive the focus area setting information and the focus area reference line information through a signal line connected to a data driving circuit 230 positioned outside the substrate.

The substrate may be formed of silicon, and the focus area setting circuit 260 and the gate control circuit 270 may be disposed on the substrate.

The display device 200 may further comprise a plurality of emission control lines EML electrically connected with the plurality of subpixels SP and a plurality of emission control switches EMS electrically connected with the plurality of emission control lines EML, respectively, and disposed outside the plurality of subpixels SP.

The scan signal may be configured to be simultaneously supplied to two or more gate lines GL among the plurality of gate lines GL, and two or more emission control switches EMS electrically connected with two or more emission control lines EML, respectively, corresponding to the two or more gate lines GL, respectively, may be configured to be simultaneously turned on and simultaneously turned off.

A display device 200 according to aspects of the disclosure may comprise a plurality of subpixels SP disposed on a substrate and including a light emitting element ED, a plurality of gate lines GL supplying a scan signal to the plurality of subpixels SP, a plurality of emission control lines EML controlling an emission period of the light emitting element ED included in the plurality of subpixels SP, and a plurality of emission control switches EMS electrically connected with the plurality of emission control lines EML, respectively, and positioned outside the plurality of subpixels SP. The scan signal may be configured to be simultaneously supplied to N (N is an integer meeting N>2) adjacent gate lines GL among the plurality of gate lines GL in a first horizontal period HT1 of a frame period. N emission control switches EMS electrically connected with N emission control lines EML corresponding to the N gate lines GL may be configured to be simultaneously turned on and simultaneously turned off.

The scan signal may be configured to be simultaneously supplied to M (M is an integer meeting N>M≥2) adjacent gate lines GL among the plurality of gate lines GL in a second horizontal period HT2 of the frame period. M emission control switches EMS electrically connected with M emission control lines EML corresponding to the M gate lines GL may be configured to be simultaneously turned on and simultaneously turned off.

The N emission control switches EMS and the M emission control switches EMS may be configured to be simultaneously turned on and simultaneously turned off.

The plurality of emission control switches EMS may be positioned inside a gate driving circuit 220 driving the plurality of gate lines GL.

A virtual reality device 100 according to aspects of the disclosure may comprise a silicon substrate, a plurality of subpixels SP disposed on the substrate and including a light emitting element ED, a plurality of gate lines GL supplying a scan signal to the plurality of subpixels SP, a focus area setting circuit 260 disposed on the silicon substrate and configured to receive focus area setting information and focus area reference line information and set at least one piece of focus area boundary information, and a gate control circuit 270 disposed on the silicon substrate and configured to set a number of the gate lines GL where the scan signal is simultaneously supplied in each of a plurality of horizontal periods HT of a frame period based on the focus area setting information and the at least one piece of focus area boundary information.

The above description has been presented to enable any person skilled in the art to make and use the technical idea of the disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the disclosure. The above description and the accompanying drawings provide an example of the technical idea of the disclosure for illustrative purposes only. That is, the disclosed aspects are intended to illustrate the scope of the technical idea of the disclosure. Thus, the scope of the disclosure is not limited to the aspects shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A display device, comprising:
   a plurality of subpixels disposed on a substrate and including a light emitting element;
   a plurality of gate lines supplying a scan signal to the plurality of subpixels;
   a gate driving circuit configured to drive the plurality of gate lines;
   a focus area setting circuit configured to receive focus area setting information and focus area reference line information and set focus area boundary information; and
   a gate control circuit configured to set a number of the gate lines where the scan signal is simultaneously supplied by the gate driving circuit in each of a plurality of horizontal periods of a frame period based on the focus area setting information and the focus area boundary information,
   wherein the focus area setting information includes at least one of a focus area driving mode value, a focus area size value, and a focus area compression ratio value,
   wherein the focus area boundary information is calculated based on the focus area reference line information and the focus area size value, and wherein the number of the focus area size values is smaller than the number of the focus area compression ratio values.

2. The display device of claim 1, wherein the focus area boundary information is calculated and set when a gate start pulse is input.

3. The display device of claim 1, wherein the number of the gate lines where the scan signal is simultaneously supplied in each area set by the focus area boundary information is determined based on the focus area compression ratio value corresponding to each area.

4. The display device of claim 1, wherein the focus area setting circuit is configured to receive the focus area reference line information before the frame period starts.

5. The display device of claim 1, wherein the focus area reference line information includes a reference line value indicating between two adjacent gate lines among the plurality of gate lines or indicating at least one of the two adjacent gate lines.

6. The display device of claim 1, wherein the focus area setting circuit is configured to receive the focus area setting information and the focus area reference line information through a signal line connected to a data driving circuit positioned outside the substrate.

7. The display device of claim 1, wherein the substrate includes silicon, and wherein the focus area setting circuit and the gate control circuit are disposed on the substrate.

8. The display device of claim 1, further comprising:
a plurality of emission control lines electrically connected with the plurality of subpixels; and
a plurality of emission control switches electrically connected with the plurality of emission control lines and disposed outside the plurality of subpixels.

9. The display device of claim 8, wherein the scan signal is configured to be simultaneously supplied to two or more gate lines among the plurality of gate lines, and
wherein two or more emission control switches electrically connected with two or more emission control lines corresponding to the two or more gate lines are configured to be simultaneously turned on and simultaneously turned off.

10. A virtual reality device, comprising:
a substrate;
a plurality of subpixels disposed on the substrate and including a light emitting element;
a plurality of gate lines supplying a scan signal to the plurality of subpixels;
a focus area setting circuit disposed on the substrate and configured to receive focus area setting information and focus area reference line information and set focus area boundary information; and
a gate control circuit disposed on the substrate and configured to set a number of the gate lines where the scan signal is simultaneously supplied in each of a plurality of horizontal periods of a frame period based on the focus area setting information and the focus area boundary information,
wherein the focus area setting information includes at least one of a focus area driving mode value, a focus area size value, and a focus area compression ratio value,
wherein the focus area boundary information is calculated based on the focus area reference line information and the focus area size value, and
wherein the number of the focus area size values is smaller than the number of the focus area compression ratio values.

11. A display device, comprising:
a plurality of subpixels disposed on a substrate and including a light emitting element;
a plurality of gate lines supplying a scan signal to the plurality of subpixels;
a gate driving circuit configured to drive the plurality of gate lines;
a focus area setting circuit configured to set a plurality of focus areas according to a user's gaze direction with respect to the display device; and
a gate control circuit configured to apply a different driving scheme to each of the plurality of focus areas for increasing a frame rate of the image displayed by the display device,
wherein the focus area setting information includes at least one of a focus area driving mode value, a focus area size value, and a focus area compression ratio value,
wherein the focus area boundary information is calculated based on the focus area reference line information and the focus area size value, and
wherein a number of the focus area size values is smaller than a number of the focus area compression ratio values.

* * * * *